United States Patent
Namba et al.

(10) Patent No.: US 11,436,617 B2
(45) Date of Patent: Sep. 6, 2022

(54) BEHAVIOR PATTERN SEARCH SYSTEM AND BEHAVIOR PATTERN SEARCH METHOD

(71) Applicant: Hitachi, Ltd., Tokyo (JP)

(72) Inventors: Hiroyuki Namba, Tokyo (JP); Masaharu Ukeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 191 days.

(21) Appl. No.: 16/122,924

(22) Filed: Sep. 6, 2018

(65) Prior Publication Data

US 2019/0266619 A1 Aug. 29, 2019

(30) Foreign Application Priority Data

Feb. 26, 2018 (JP) .............................. JP2018-032135

(51) Int. Cl.
*G06Q 30/02* (2012.01)
*G06F 16/955* (2019.01)

(52) U.S. Cl.
CPC ....... *G06Q 30/0201* (2013.01); *G06F 16/955* (2019.01)

(58) Field of Classification Search
None
See application file for complete search history.

(56) References Cited

U.S. PATENT DOCUMENTS

| | | | |
|---|---|---|---|
| 7,630,986 B1 * | 12/2009 | Herz | G06Q 10/10 |
| 8,306,845 B2 * | 11/2012 | D'Imporzano | G06Q 10/06393 |
| | | | 705/7.29 |
| 10,346,688 B2 * | 7/2019 | Togashi | G06K 9/00671 |
| 10,997,672 B2 * | 5/2021 | Chen | G06N 20/00 |
| 2008/0033816 A1 * | 2/2008 | Miller | G06Q 30/0236 |
| | | | 705/14.18 |
| 2011/0137847 A1 * | 6/2011 | Fahner | G06Q 40/02 |
| | | | 706/52 |
| 2012/0166250 A1 * | 6/2012 | Ferrante | G06Q 30/0201 |
| | | | 705/7.29 |
| 2014/0136104 A1 * | 5/2014 | Spears | G01C 21/3484 |
| | | | 701/521 |

(Continued)

FOREIGN PATENT DOCUMENTS

JP 2015-95120 A 5/2015

OTHER PUBLICATIONS

Qiu, Jiangtao, Zhangxi Lin, and Yinghong Li. "Predicting customer purchase behavior in the e-commerce context." Electronic commerce research 15.4 (2015): 427-452. (Year: 2015).*

(Continued)

*Primary Examiner* — Thomas L Mansfield
(74) *Attorney, Agent, or Firm* — Mattingly & Malur, PC

(57) ABSTRACT

A behavior pattern search system and method is disclosed. A change in a behavior pattern contributing to improving a Key Performance Indicator (KPI) is discovered from among changes in the behavior pattern arising in common among customers having a specific characteristic. The behavior pattern search system classifies transfiguration candidates that are customers satisfying transfiguration result information. The transfiguration result information indicates a characteristic purchase behavior predicted to occur by a change in a behavior pattern of each of the customers.

2 Claims, 12 Drawing Sheets

(56) References Cited

U.S. PATENT DOCUMENTS

2014/0172576 A1* 6/2014 Spears ............... G06Q 30/0266
                                                                    705/14.63
2015/0170175 A1* 6/2015 Zhang ................... H04M 15/44
                                                                    705/7.33

OTHER PUBLICATIONS

Qiu, Jiangtao. "A predictive Model for Customer Purchase Behavior in E-Commerce Context." PACIS. 2014. (Year: 2014).*

Heumann, Christian. The Effects of failure and recovery on customer purchase behavior. Diss. Technische Universität Munchen, 2012. (Year: 2012).*

* cited by examiner

FIG.2

PURCHASE HISTORY INFORMATION   210

| CUSTOMER ID | PURCHASE DATE | COMMODITY PRODUCT ID | COMMODITY PRODUCT CATEGORY | NUMBER | AMOUNT |
|---|---|---|---|---|---|
| 1 | 2017-09-01 | 11 | BEVERAGE | 1 | 120 |
| 1 | 2017-09-08 | 12 | BEVERAGE | 3 | 300 |
| 1 | 2017-09-15 | 11 | BEVERAGE | 1 | 120 |
| 2 | 2017-09-15 | 11 | BEVERAGE | 1 | 120 |
| 2 | 2017-09-15 | 13 | BOX LUNCH | 1 | 400 |
| 3 | 2017-09-15 | 12 | BEVERAGE | 1 | 100 |
| 4 | 2017-09-15 | 11 | BEVERAGE | 5 | 600 |
| 5 | 2017-09-15 | 11 | BEVERAGE | 5 | 600 |
| ⋮ | ⋮ | ⋮ | ⋮ | ⋮ | |

FIG.3

CUSTOMER ATTRIBUTE INFORMATION 220

| DATE | CUSTOMER ID | AGE | CUMULATIVE TOTAL OF NUMBER OF USES OF COUPONS | ... |
|---|---|---|---|---|
| 2017-08-25 | 4 | 40 | 0 | ... |
| 2017-09-01 | 1 | 20 | 1 | ... |
| 2017-09-01 | 4 | 40 | 1 | ... |
| 2017-09-01 | 5 | 50 | 0 | ... |
| 2017-09-08 | 1 | 20 | 1 | ... |
| 2017-09-08 | 2 | 25 | 2 | ... |
| 2017-09-08 | 3 | 30 | 0 | ... |
| 2017-09-08 | 4 | 40 | 1 | ... |
| 2017-09-08 | 5 | 50 | 0 | ... |
| 2017-09-15 | 1 | 20 | 1 | ... |
| 2017-09-15 | 2 | 25 | 2 | ... |
| 2017-09-15 | 3 | 30 | 0 | ... |
| 2017-09-15 | 4 | 40 | 2 | ... |
| 2017-09-15 | 5 | 50 | 0 | ... |
| ⋮ | ⋮ | ⋮ | ⋮ | ... |

FIG.4

TRANSFIGURATION RESULT INFORMATION 230

| TRANSFIGURATION RESULT ID | COMMODITY PRODUCT SET | NUMBER (LOWER LIMIT) | NUMBER (UPPER LIMIT) | PURCHASE PERIOD |
|---|---|---|---|---|
| 1 | 11, 12 | 0 | 0 | BETWEEN 2017-08-01 AND 2017-08-31 |
|   | 11, 12 | 5 | NULL | BETWEEN 2017-09-01 AND 2017-09-30 |
| 2 | ⋮ | ⋮ | ⋮ | ⋮ |
| ⋮ | ⋮ | ⋮ | ⋮ | ⋮ |

FIG. 5

DISCOVERY/NON-DISCOVERY INFORMATION TABLE 510

| TRANSFIGURATION RESULT ID | WAS CHANGE IN BEHAVIOR PATTERN DISCOVERED? |
|---|---|
| 1 | YES |
| 2 | NO |
| ⋮ | ⋮ |

BEHAVIOR PATTERN CHANGE TABLE 520

| KEY | VALUE |
|---|---|
| TRANSFIGURATION RESULT ID | 1 |
| TRANSITION PATH | (A、B、D、E) |
| STATE JUST BEFORE CHANGE IN BEHAVIOR PATTERN | B |
| STATE JUST AFTER CHANGE IN BEHAVIOR PATTERN | D |
| STATE CONTRIBUTING TO IMPROVING KPI, WHICH IS RESULT OF CHANGE IN BEHAVIOR PATTERN | E |
| LIST OF CUSTOMERS HAVING EXPERIENCED CHANGE IN BEHAVIOR PATTERN | {4} |

FIG.6

NUMBER OF PURCHASED BEVERAGES PER WEEK: 3 OR MORE

CUMULATIVE TOTAL OF NUMBER OF USES OF COUPONS: 1 OR MORE

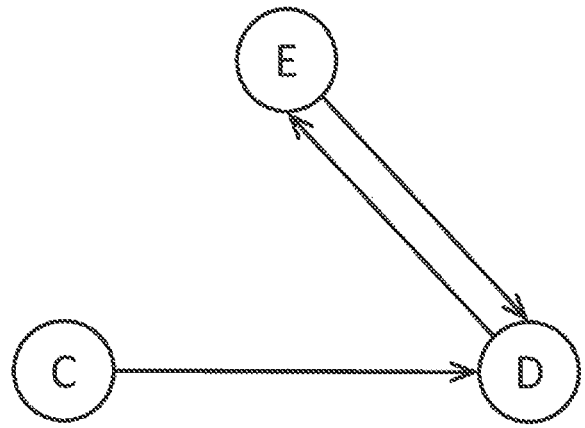

NUMBER OF PURCHASED BEVERAGES PER WEEK: 0

CUMULATIVE TOTAL OF NUMBER OF USES OF COUPONS: 1 OR MORE

NUMBER OF PURCHASED BEVERAGES PER WEEK: 1 OR MORE AND 2 OR LESS

CUMULATIVE TOTAL OF NUMBER OF USES OF COUPONS: 1 OR MORE

NUMBER OF PURCHASED BEVERAGES PER WEEK: 0

CUMULATIVE TOTAL OF NUMBER OF USES OF COUPONS: 0

NUMBER OF PURCHASED BEVERAGES PER WEEK: 1 OR MORE

CUMULATIVE TOTAL OF NUMBER OF USES OF COUPONS: 0

FIG.7

VERTEX STATE TABLE  710

| VERTEX ID | STATE | EXCELLENT FLAG | STATE GROUP |
|---|---|---|---|
| A | NUMBER OF PURCHASED BEVERAGES PER WEEK: 0<br>CUMULATIVE TOTAL OF NUMBER OF USES OF COUPONS: 0 | NO | 1 |
| B | NUMBER OF PURCHASED BEVERAGES PER WEEK: 1 OR MORE<br>CUMULATIVE TOTAL OF NUMBER OF USES OF COUPONS: 0 | NO | 1 |
| C | NUMBER OF PURCHASED BEVERAGES PER WEEK: 0<br>CUMULATIVE TOTAL OF NUMBER OF USES OF COUPONS: 1 OR MORE | NO | 2 |
| D | NUMBER OF PURCHASED BEVERAGES PER WEEK: 1 OR MORE AND 2 OR LESS<br>CUMULATIVE TOTAL OF NUMBER OF USES OF COUPONS: 1 OR MORE | NO | 2 |
| E | NUMBER OF PURCHASED BEVERAGES PER WEEK: 3 OR MORE<br>CUMULATIVE TOTAL OF NUMBER OF USES OF COUPONS: 1 OR MORE | YES | 2 |

STATE TRANSITION CORRESPONDENCE RELATIONSHIP TABLE  720

| STATE BEFORE TRANSITION | STATE AFTER TRANSITION |
|---|---|
| A | B |
| C | D |
| D | E |
| E | D |

TRANSFIGURATION RESULT ID: 1

TRANSFIGURATION RESULT INFORMATION

| COMMODITY PRODUCT SET | NUMBER (LOWER LIMIT) | NUMBER (UPPER LIMIT) | PURCHASE PERIOD |
|---|---|---|---|
| 11, 12 | 0 | 0 | BETWEEN 2017-08-01 AND 2017-08-31 |
| 11, 12 | 5 | NULL | BETWEEN 2017-09-01 AND 2017-09-30 |

LIST OF CUSTOMERS HAVING EXPERIENCED CHANGE IN BEHAVIOR PATTERN: {4}

FIG.12

| CUSTOMER (OUTPUT IN STEP S203) | KINDS AND NUMBERS OF COMMODITY PRODUCTS PURCHASED IN ANALYSIS PERIOD | KINDS AND NUMBERS OF COMMODITY PRODUCTS PURCHASED IN COMPARISON PERIOD | DIFFERENCE BETWEEN ANALYSIS PERIOD AND COMPARISON PERIOD (OUTPUT IN STEP S204) |
|---|---|---|---|
| 1 | A: 5<br>B: 2<br>C: 1 | A: 2<br>B: 4 | A: 3<br>B: -2<br>C: 1 |
| 3 | A: 4<br>D: 2 | | A: 4<br>D: 2 |
| ⋮ | ⋮ | ⋮ | ⋮ |

BEHAVIOR PATTERN SEARCH SYSTEM AND BEHAVIOR PATTERN SEARCH METHOD

FIELD OF THE INVENTION

1. Field of the Invention

The present invention relates to a behavior pattern search system and a behavior pattern search method.

2. Description of the Related Art

Examples of challenges in a conventional marketing field include a need to take proper measures for each customer for improving a KPI (Key Performance Indicator). To address this challenge, conventional techniques have tried to model a purchase behavior of each customer. According to, for example, JP-2015-095120-A, a score representing a probability that each customer purchases each commodity product is calculated on the basis of previous purchase behaviors and changes in purchase trends of overall customers are modeled.

To address the conventional challenge described above, it is also conceivable to take an approach to discover a change in a behavior pattern that could contribute to improving the KPI from among changes in the behavior pattern arising commonly to customers having a specific characteristic using the technique described in JP-2015-095120-A. This approach is based on the belief that guiding more customers to the change enables improvement in the KPI once such a change in the behavior pattern can be discovered.

However, with the technique described in JP-2015-095120-A, the purchase behavior of each customer is analyzed; thus, it is not always possible to discover the change in the behavior pattern that could contribute to improving the KPI from among the changes in the behavior pattern arising commonly to the customers having the specific characteristic.

SUMMARY OF THE INVENTION

An object of the present invention is to provide a behavior pattern search system and a behavior pattern search method capable of discovering a change in a behavior pattern that could contribute to improving a KPI from among changes in the behavior pattern arising commonly to customers having a specific characteristic.

A behavior pattern search system according to the present invention is configured as a behavior pattern search system including: a candidate model creation section that classifies transfiguration candidates that are customers satisfying transfiguration result information that indicates a characteristic purchase behavior predicted to occur by a change in a behavior pattern of each of the customers, on the basis of the transfiguration result information and a state transition model which is created on the basis of purchase history information about each customer and customer attribute information and which indicates a trend of states of the customers; and a behavior transfiguration search section that selects a state transition path of one of the customers along which transition crossing state groups obtained by grouping customer states by a predetermined method occurs from among state transition paths of the customers having characteristic state transition out of the customers classified as the transfiguration candidates, and that outputs an analysis result containing the selected state transition path of the customer.

Furthermore, the present invention is grasped as a behavior pattern search method executed by the behavior pattern search system.

According to the present invention, it is possible to discover the change in the behavior pattern, among the changes in the behavior pattern arising commonly to customers having a specific characteristic, which could contribute to improving the KPI.

BRIEF DESCRIPTION OF THE DRAWINGS

FIG. 2 illustrates an example of purchase history information;

FIG. 3 illustrates an example of customer attribute information;

FIG. 4 illustrates an example of transfiguration result information;

FIG. 5 illustrates an example of an analysis result;

FIG. 6 illustrates an example of a state transition model for overall customers;

FIG. 7 illustrates an example of outputs by an analysis section;

FIG. 12 illustrates an example of the process in Step S204.

DESCRIPTION OF THE PREFERRED EMBODIMENTS

Embodiments of a behavior pattern search system and a behavior pattern search method will be described hereinafter in detail with reference to the accompanying drawings. While the embodiments are described hereinafter on the premise that the present system is configured with a plurality of servers and a terminal, the servers and the terminal may be configured as one device.

First Embodiment

Figure 1:
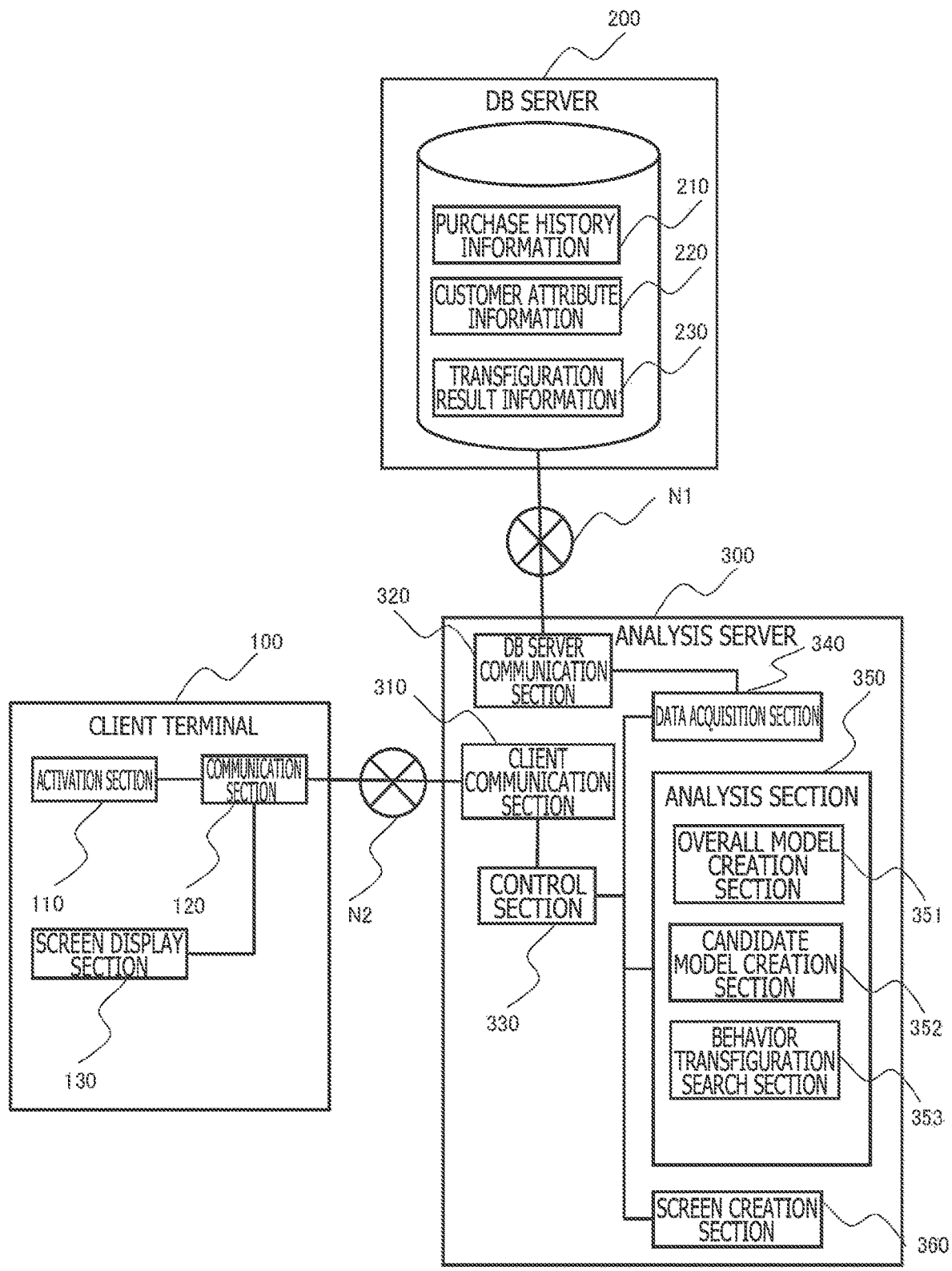
FIG. 1 is a system configuration diagram according to a first embodiment.

In a first embodiment, a scheme for discovering changes in a behavior pattern on the basis of purchase history information, customer attribute information, and transfiguration result information will be described. FIG. 1 illustrates an example of a configuration of a behavior pattern search system 1000 according to the present embodiment. As illustrated in FIG. 1, the present system 1000 is configured with a client terminal 100, a DB (Database) server 200, and an analysis server 300. These devices 100, 200, and 300 can transmit and receive information to and from one another via networks N1 and N2. The networks N1 and N2 are each physically configured from an ordinary communication line network such as the Internet.

The client terminal 100 is a terminal used by an analyst who uses the present system 1000. As illustrated in FIG. 1, the client terminal 100 has an activation section 110 that is a program transmitting an analysis start signal and access information about access to the DB server 200, a communication section 120 that is a program for communicating with the analysis server 300, and a screen display section 130 that displays an analysis result.

The client terminal 100 is configured by an ordinary computer such as a PC (Personal Computer) as hardware, and includes such sections as a CPU (Central Processing Unit), a memory, an external memory device, a communication I/F (Interface), an output device, and an input device. These sections configuring the client terminal 100 are electrically connected to one another by an internal communication line such as an internal bus.

The CPU reads various programs stored in the external memory device, loads the various programs into the memory, and executes the various programs, thereby realizing various functions of the client terminal 100. The memory is configured with, for example, a data readable-writable RAM (Random Access Memory), and the various programs are loaded into the memory by the CPU. The external memory device is configured with, for example, a memory medium such as a ROM (Read Only Memory) or a memory device such as an HDD (Hard Disk Drive) or an SSD (Solid State Drive), and stores the various programs necessary for processes performed by the client terminal 100.

It is noted that the various programs may be downloaded to the external memory device from a network via the communication I/F, loaded onto the memory, and executed by the CPU. Alternatively, the various programs may be directly loaded onto the memory from a portable computer readable memory medium such as a CD (Compact Disk) or a DVD (Digital Versatile Disk) via a read-write device reading and writing information from and to the memory medium, and executed by the CPU. In another alternative, the various programs may be provided or distributed by being recorded in the memory medium as files in a format in which the files can be installed into a computer or executed by the computer. In yet another alternative, the various programs may be provided or distributed by being stored on a computer connected to a communication network and downloaded via the network. Specific processes performed by the client terminal 100 will be described later. The DB server 200 will next be described.

The DB server 200 is a server that accumulates various data used in the present system 1000. As illustrated in FIG. 1, purchase history information 210 illustrated in FIG. 2, customer attribute information 220 illustrated in FIG. 3, and transfiguration result information 230 illustrated in FIG. 4 are stored in a database of the DB server 200.

FIG. 2 is a diagram illustrating an example of the purchase history information 210. The purchase history information 210 is a table that represents when each customer purchased what commodity products. As illustrated in FIG. 2, in the purchase history information 210, a customer ID for identifying each customer, a purchase date indicating a date at which the customer purchased a commodity product (commodity products), a commodity product ID for identifying the commodity product(s) purchased by the customer at the purchase date, a commodity product category indicating a classification of the commodity product(s) identified by the commodity product ID, the number indicating the number of the purchased commodity products, and an amount of the purchase of the commodity product(s) are stored to correspond to one another.

In FIG. 2, it is indicated, for example, that a customer with a customer ID "4" purchased five beverages with a commodity product ID "11" and that a purchased price of the beverages is 600 yen.

FIG. 3 is a diagram illustrating an example of the customer attribute information 220. The customer attribute information 220 is a table that represents an attribute of each customer. The attribute is incidental information for determining whether there is a change in a behavior pattern of the customer. Furthermore, the behavior pattern of the customer is a pattern of a state transition of the customer. The state transition of the customer will be described later with reference to FIG. 6. While a "cumulative total of the number of uses of coupons" is exemplarily described below as the attribute, various information can be defined as the attribute depending on analytical conditions or the like. As illustrated in FIG. 3, in the customer attribute information 220, a purchase date indicating the date at which each customer purchased a commodity product (commodity products), a customer ID for identifying the customer, an age of the customer, and a cumulative total of the number of uses of coupons indicating a cumulative total value of the number of customer's uses of coupons are stored to correspond to one another.

In FIG. 3, it is indicated, for example, that the customer with the customer ID "4" is aged 40, purchased a commodity product (commodity products) on Aug. 25, 2017 without using a coupon, and purchased a commodity product (commodity products) on Sep. 1, 2017 using a coupon (the cumulative total of the number of uses of coupons is "1"). It is also indicated that the customer with the customer ID "4" purchased a commodity product (commodity products) on Sep. 8, 2017 without using a coupon and purchased a commodity product (commodity products) on Sep. 15, 2017 using a coupon (the cumulative total of the number of uses of coupons is "2").

An analyst who utilizes the present system 1000 acquires the purchase history information 210 and the customer attribute information 220 by methods different from each other before start of analysis, and stores the purchase history information 210 and the customer attribute information 220 in the DB server 200 in advance. For example, purchase history information and customer attribute information have been normally already collected for recommendation or the like on an EC (Electronic Commerce) website. In such circumstances, there is no need to collect the purchase history information 210 and the customer attribute information 220 anew for the present analysis.

FIG. 4 is a diagram illustrating an example of the transfiguration result information 230. The transfiguration result information 230 is a list of characteristic purchase behaviors predicted to arise by a change in the behavior pattern of each customer. As illustrated in FIG. 4, in the transfiguration result information 230, a transfiguration result ID for identifying a result of behavior transfiguration of each customer, a commodity product set indicating a set of commodity products purchased at a time of the behavior transfiguration of the customer identified by the transfiguration result ID, a lower limit and an upper limit of the number of commodity products indicating the number of purchased commodity products in the commodity product set, and a purchase period indicating a period in which the customer purchased the commodity product set are stored to correspond to one another.

In FIG. 4, a transfiguration result with a transfiguration result ID "1" indicates the change in the behavior pattern of the customer, for example, such that the customer did not purchase a commodity product with the commodity product ID "11" or "12" in a period from Aug. 1, 2017 to Aug. 31, 2017, and purchased five or more commodity products with the commodity product ID "11" or "12" in a next period from Sep. 1, 2017 to Sep. 30, 2017. In this way, in the transfiguration result information 230, one transfiguration result ID corresponds to one characteristic purchase behavior of the customer.

In the present embodiment, the analyst who utilizes the present system 1000 manually sets the transfiguration result information 230 in advance before start of analysis and stores the transfiguration result information 230 in the DB server 200. For example, in a case in which commodity products are classified in categories as illustrated in FIG. 2, the number of commodity products in each category purchased within one month, by which the result is regarded as the transfiguration result, is estimated and information about the estimated number is set. The analysis server 300 will next be described.

The analysis server 300 is a server that performs processes for searching the behavior pattern of each customer in the present system 1000. As illustrated in FIG. 1, the analysis server 300 is configured with a client communication section 310 that is a program for communicating with the client terminal 100, a DB server communication section 320 that is a program for communicating with the DB server 200, a control section 330, a data acquisition section 340, an analysis section 350, and a screen creation section 360.

The control section 330 is a control program as follows. First, the control section 330 receives input information from the client communication section 310. The input information means the analysis start signal transmitted from the activation section 110 to the control section 330 by way of the communication section 120 and the client communication section 310 and the access information about access to the DB server 200.

The control section 330 then activates the data acquisition section 340, which is a program, with reception of the start signal as a trigger. At that time, the control section 330 transmits the access information (for example, a login ID and a login password) about access to the DB server 200 to the data acquisition section 340. The data acquisition section 340 acquires the purchase history information 210, the customer attribute information 220, and the transfiguration result information 230 from the DB server 200 on the basis of the access information about access to the DB server 200 transmitted from the control section 330, and stores the acquired data in a memory of the analysis server 300. In addition, the data acquisition section 340 transmits the end signal and the data storage location to the control section 330 at a time of ending execution.

The control section 330 activates the analysis section 350, which is a program, with reception of the end signal from the data acquisition section 340 as a trigger. At that time, the control section 330 transmits the data storage location to the analysis section 350. The analysis section 350 is the program to which the purchase history information 210, the customer attribute information 220, and the transfiguration result information 230 stored in the data storage location transmitted from the control section 330 are input, and which outputs an analysis result as illustrated in FIG. 5. Specifically, the analysis section 350 outputs a discovery/non-discovery information indicating whether a change in a characteristic behavior pattern was discovered with respect to each transfiguration result information identified by the transfiguration result ID in the transfiguration result information 230.

An upper side of FIG. 5 is a diagram illustrating an example of a discovery/non-discovery information table 510 that stores such discovery/non-discovery information. As illustrated in the upper side of FIG. 5, in the discovery/non-discovery information table 510, the transfiguration result ID for identifying the result of behavior transfiguration of each customer, and discovery/non-discovery information (YES or NO) indicating whether the change in the behavior pattern of the customer identified by the transfiguration result ID was discovered as a result of the analysis to be described later are stored to correspond to each other. In the upper side of FIG. 5, it is indicated that it was analyzed that there was the change in the behavior pattern of the customer as a result of the transfiguration behavior of the customer identified by the transfiguration result ID.

Furthermore, the analysis section 350 outputs a behavior pattern change table 520 that indicates details of the change in the behavior pattern as illustrated in a table on a lower side of FIG. 5 with respect to each transfiguration result information indicating that the change in the characteristic behavior pattern was discovered. A specific content of the details of the change in the behavior pattern will be described later.

Moreover, the analysis section 350 outputs a state transition model as illustrated in FIG. 6. Details of the state transition model will be described later.

Furthermore, the analysis section 350 is configured with an overall model creation section 351, a candidate model creation section 352, and a behavior transfiguration search section 353.

The overall model creation section 351 outputs the state transition model (FIG. 6) of overall customers on the basis of the purchase history information 210 and the customer attribute information 220, and stores the output state transition model in the memory of the analysis server 300. The state transition model of the overall customers is a directed graph indicating an overall trend of state transitions of the customers. Each vertex represents a state of the customers and a directional branch between the vertexes indicates easiness to move between the vertexes.

The states of the customers each indicate herein a set of conditions for determining the purchase behavior and the attribute of each customer. Since each customer always corresponds to one state in the state transition model, the customer corresponds to any one of the vertexes. As illustrated in FIG. 6, each vertex corresponds to the state of the customer. For example, the vertex C corresponds to the state of the customer in which the number of purchased beverages per week is zero and the cumulative total of the number of uses of coupons is equal to or higher than one. In addition, each vertex is connected to the other vertex by the directional branch on the basis of easiness to move. While the number of purchased beverages per week and the cumulative total of the number of uses of coupons per week are illustrated as the vertexes indicating the state of the customer in the present embodiment, various information can be set as the vertexes depending on the behavior pattern of the customer. In this way, each of the states of all customers corresponds to any one of the vertexes on the basis of the conditions for determining both the purchase behavior and the attribute of each customer.

Which state each customer corresponds to at each time in the state transition model output from the overall model creation section 351 can be determined from the purchase history information 210 and the customer attribute information 220. In addition, the overall model creation section 351 outputs an excellent flag that represents whether each state in the state transition model is an excellent state and a state group number of each state. The elements output by the overall model creation section 351 described so far can be compiled into two lists as illustrated in FIG. 7. While the state transition model is expressed by the directed graph in FIG. 6, the same state transition model is described in FIG. 7 in a structure of a list of the vertexes and the branches.

For example, as illustrated in a vertex state table 710 that indicates the state of each vertex in an upper side of FIG. 7, a vertex ID for identifying each vertex, a state of the vertex, the excellent flag described above, and the state group number described above are stored to correspond to one another. In this example, the states corresponding to vertexes A to E of the state transition model illustrated in FIG. 6 are stored, and it is indicated that the vertexes A and B form the state group "1," the vertexes C to E form the state group "2," and the vertex E was analyzed to be in an excellent state. Furthermore, as illustrated in a state transition correspondence relationship table 720 that indicates a correspondence relationship between the vertex before the state transition and that after the state transition in a lower side of FIG. 7, a state before transition and a state after transition are stored to correspond to each other. In this example, it is indicated that the vertex A on the state transition model illustrated in FIG. 6 transitions to the vertex B, the vertex C transitions to the vertex D, and the vertexes D and E transition to the vertexes E and D, respectively.

The candidate model creation section 352 outputs a set of characteristic transition paths of a transfiguration candidate set on the state transition model created by the overall model creation section 351. Details of processes will be mentioned in the description of a processing flow to be described later.

The behavior transfiguration search section 353 outputs the analysis result illustrated in FIG. 5 and stores the analysis result in the memory of the analysis server 300. In addition, the behavior transfiguration search section 353 transmits and end signal and the data storage location to the control section 330 when the analysis section 350 ends execution.

The control section 330 activates the screen creation section 360, which is a program, with reception of the end signal from the analysis section 350 as a trigger. At that time, the control section 330 transmits a storage location of an output result of the analysis section 350 and a storage location of the transfiguration result information to the screen creation section 360.

Figure 8:
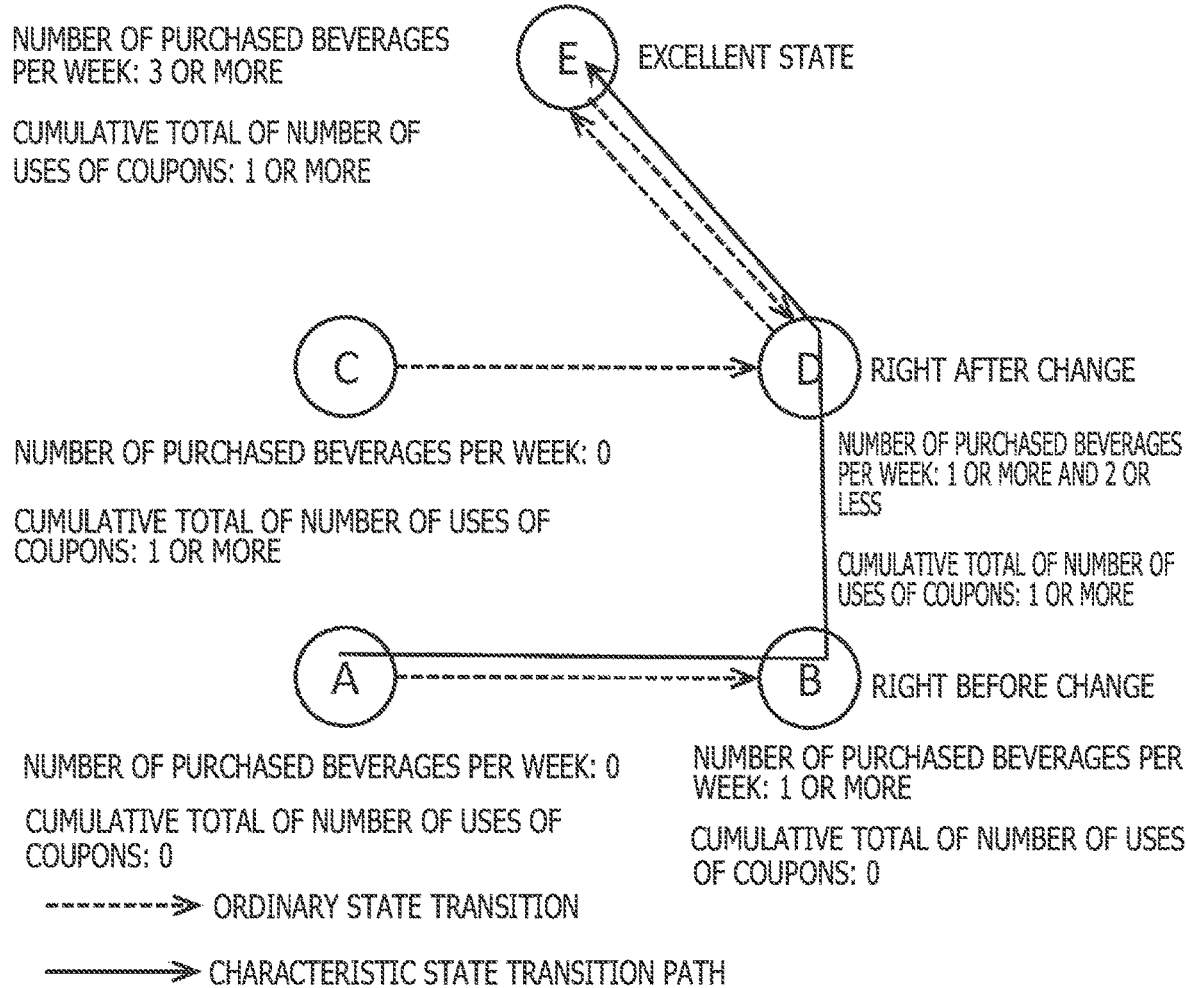
FIG. 8 illustrates an example of display of a screen display section.

The screen creation section 360 is the program that generates data for outputting an analysis result screen which displays the analysis result about the transfiguration result as in FIG. 8, on the basis of the transfiguration result information 230 as in FIG. 4, the information about the change in the behavior pattern (the discovery/non-discovery information table 510 and the behavior pattern change table 520) output as the analysis result as in FIG. 5, and the state transition model (the vertex state table 710 and the state transition correspondence relationship table 720) as in FIG. 7. This screen is used, for example, for an analyst or a person who desires to determine measures for marketing to confirm the analysis result.

The DB server 200 and the analysis server 300 are each configured by an ordinary computer such as a server as hardware, and include such sections as a CPU, a memory, an external memory device, a communication I/F, an output device, and an input device. These sections configuring each of these servers 200 and 300 are electrically connected to one another by an internal communication line such as an internal bus.

The CPU reads various programs stored in the external memory device, loads the various programs into the memory, and executes the various programs, thereby realizing various functions of each of these servers 200 and 300. The memory is configured with, for example, a data readable-writable RAM, and the various programs are loaded into the memory by the CPU. The external memory device is configured with, for example, a memory medium such as a ROM or a memory device such as an HDD or an SSD, and stores the various programs necessary for processes performed by each of these servers 200 and 300.

It is noted that the various programs may be downloaded to the external memory device from a network via the communication I/F, loaded onto the memory, and executed by the CPU. Alternatively, the various programs may be directly loaded onto the memory from a portable computer readable memory medium such as a CD or a DVD via read-write device reading and writing information from and to the memory medium, and executed by the CPU. In another alternative, the various programs may be provided or distributed by being recorded in the memory medium as files in a format in which the files can be installed into a computer or executed by the computer. In yet another alternative, the various programs may be provided or distributed by being stored on a computer connected to a communication network and downloaded via the network. Specific processes performed by these servers 200 and 300 will be described later.

FIG. 8 that illustrates an output image of the analysis result screen will now be described. When the analyst selects the transfiguration result ID on the analysis result screen, the screen creation section 360 displays the transfiguration result information corresponding to the transfiguration result ID and the corresponding analysis result by the analysis section 350. The screen creation section 360 can acquire the transfiguration result information corresponding to each transfiguration result ID from the transfiguration result information 230. In addition, the screen creation section 360 displays the analysis result of the analysis section 350 corresponding to each transfiguration result ID on the state transition model as in FIG. 7 as the state transition model on which information about the change in the behavior pattern is depicted as in FIG. 6. Specifically, the screen creation section 360 displays the analysis result as the state transition model on which a transition path output from the behavior transfiguration search section 353 is depicted. Furthermore, the screen creation section 360 displays flags for states just before and just after transition that crosses the state groups on the transition path, and for a state representing a result of the change in the behavior pattern and contributing to improving a KPI. Moreover, the screen creation section 360 displays a list of customers each having experienced the change in the behavior pattern. Further, the screen creation section 360 displays the vertexes in the same state group on the state transition model in the same color. The screen creation section 360 displays data generated for screen display on the screen display section 130 through the client communication section 310 and the communication section 120 under control of the control section 330.

Figure 9:
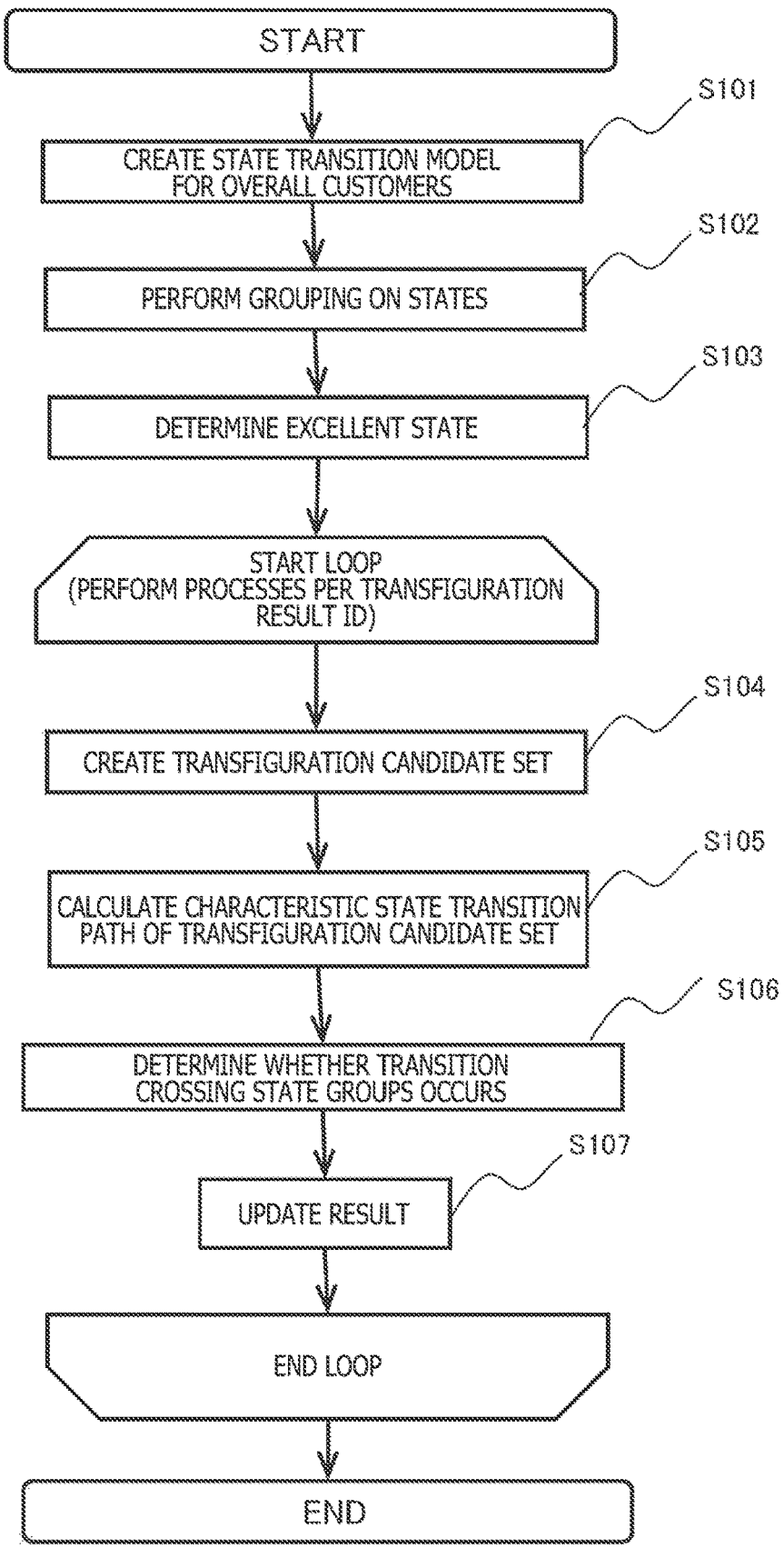
FIG. 9 is a flowchart of processes performed by the analysis section.

FIG. 9 is a flowchart illustrating processing procedures for an analysis process performed by the analysis section 350 in the present embodiment. In the analysis process, Steps S101 to S103 are executed by the overall model creation section 351, Steps S104 and S105 are executed by the candidate model creation section 352, and Steps S106 and S107 are executed by the behavior transfiguration search section 353. Details of each step in FIG. 9 will be described hereinafter.

First, in Step S101, the overall model creation section 351 creates the state transition model that is the directed graph indicating the overall trend of the state transition of the customers on the basis of the purchase history information 210 and the customer attribute information 220, as illustrated in FIG. 6. The state transition model can be created using, for example, a publicly well-known hidden Markov model. An example of a method of creating the state transition model will be described below.

First, the overall model creation section 351 selects variables that are indexes with which values about each customer can be calculated, from the purchase history information 210 and the customer attribute information 220. The overall model creation section 351 selects, for example, a variable that is the cumulative total of the number of uses of coupons described in the customer attribute information 220 and a variable that is the number of purchased beverages per week which can be calculated from the purchase history information 210. Next, the overall model creation section 351 partitions a range of each selected variable into sections, and defines vertexes that correspond to respective pairs of the sections. In the example of FIG. 6, for example, the overall model creation section 351 defines five vertexes corresponding to the states including a state in which the number of purchased beverages per week is equal to or higher than three and the cumulative total of the number of uses of coupons is equal to or higher than one, on the basis of the two variables described above. In addition, the overall model creation section 351 calculates a transition probability between the states from the purchase history information 210 and the customer attribute information 220, and draws a directional branch between the states between which the transition probability is equal to or higher than a certain value.

In Step S102, the overall model creation section 351 partitions the vertexes of the state transition model into groups in each of which one vertex tends to transition to another other vertex. Specifically, the overall model creation section 351 performs grouping on the vertexes such that branches are dense in the same group and branches are sparse between different state groups. The groups obtained by this operation are defined as state groups. It is noted that various approaches have been proposed for an algorithm for partitioning the vertexes on the graph as described above in the context of graph partitioning, community detection, and the like, and any of the approaches is available. As an example, there is a method of grouping vertex sets by connected components. If the vertexes on the state transition model of FIG. 6 are subjected to grouping by the grouping based on this method, the vertexes A and B belong to the same state group and the vertexes C, D, and E belong to the same state group.

In Step S103, the overall model creation section 351 determines an excellent state set from among the states on the state transition model created in S101. Specifically, an index that represents a degree of excellence is calculated for each state and the state for which a value of the index is equal to or higher than a threshold is defined as an excellent state. While several indexes representing the degree of excellence are conceivable, any index is available. For example, it is assumed that an average value of sales for most recent one week with respect to a customer in each of the states at latest time is the index representing the degree of excellence. It is the state transition model created in S101, the correspondence relationship determined in S102 and indicating which state group each vertex on the state transition model 601 belongs to, and the flag that represents whether each vertex is in the excellent state that are output until Step S103. The overall model creation section 351 outputs these pieces of information, and stores the information in the two lists (the vertex state table 710 and the state transition correspondence relationship table 720) as illustrated in FIG. 7.

Steps S104 to S107 are executed per transfiguration result ID described in the transfiguration result information 230.

In Step S104, the candidate model creation section 352 creates the list of customers that satisfy the transfiguration result information 230 on the basis of the purchase history information 210 and the transfiguration result information 230. This list is referred to as "transfiguration candidate set." For example, the candidate model creation section 352 reads the customer ID "4" in the purchase history information 210 of FIG. 2, and determines whether the customer with the ID "4" satisfies conditions for the transfiguration result ID "1" of FIG. 4. Since the customer with the ID "4" satisfies the conditions for the transfiguration result ID "1," the candidate model creation section 352 classifies the customer as a transfiguration candidate and causes the customer to belong to the transfiguration candidate set.

Next, to execute Step S105, the candidate model creation section 352 defines a state transition path. First, the candidate model creation section 352 defines a vertex corresponding to a candidate p at time t as $v(p, t)$ on the state transition model. In addition, the candidate model creation section 352 defines a sequence of the vertexes $v(p, t)$ (hereinafter, referred to as "vertex sequence") by incrementing the time t along an analysis period. The candidate model creation section 352 defines this vertex sequence as a state transition path corresponding to the customer p and denoted by P (p). For example, referring to the purchase history information 210 of FIG. 2 and the customer attribute information 220 of FIG. 3, the candidate model creation section 352 determines that the customer with the customer ID "4" is making a transition, on the state transition model of FIG. 6, of vertexes A→B→D→E and defines the state transition path of the customer with the customer ID "4" as P(4)=(A, B, D, E).

In Step S105, the candidate model creation section 352 obtains vertex sequences Q that satisfy the following conditions from among the vertex sequences Q=(v1, v2, . . . , vn) on the state transition model.

Condition 1: An end point vn of the vertex sequence Q belongs to the excellent state set determined in Step S103.

Condition 2: Customers the number of which is equal to or higher than a certain number k among the transfiguration candidates extracted in Step S104 transitioned along the vertex sequence Q. It is noted that the "customer p transitioned along the vertex sequence Q" means that the vertex sequence Q is contained in the state transition path P(p) as a subsequence.

Condition 3: The vertex sequence Q is the maximum among those that satisfy the above two conditions. In other words, the vertex sequence (v0, v1, v2 . . . , vn) does not satisfy Condition 1 for an arbitrary vertex v0.

The candidate model creation section 352 defines the vertex sequences Q that satisfy the above three conditions as characteristic state transition paths of the transfiguration candidate set. For example, the customer with the customer ID "4" belongs to the transfiguration candidate set in the analysis of the transfiguration result ID "1" in the example of Step S104 and the state transition path of the customer with the customer ID "4" is P(4)=(A, B, D, E). Thus, in a case of setting the threshold k to 1 (k=1), the state transition path Q=(A, B, D, E) of the customer with the customer ID "4" satisfies Condition 2. In addition, since the vertex E is in the excellent state in FIG. 7, the state transition path Q=(A, B, D, E) of the customer with the customer ID "4" satisfies Condition 1. Furthermore, since the state transition path Q is the maximum among those that satisfy Conditions 1 and 2, the state transition path Q also satisfies Condition 3. Therefore, the candidate model creation section 352 determines that the state transition paths Q as the characteristic state transition paths of the transfiguration candidate set. Moreover, the candidate model creation section 352 calculates the list of customers, among the transfiguration candidates, who transitioned along each of the output characteristic state transition paths Q. In this way, in Step S105, the candidate model creation section 352 obtains the state transition paths that satisfy the transfiguration result information 230 illustrated in FIG. 4 as the characteristic transition paths among the state transition paths that satisfy Condition 1 for the excellent state, and compiles the list of customers who transitioned along each of the obtained characteristic transition paths to calculate the number of customers.

In Step S106, the behavior transfiguration search section 353 identifies the characteristic state transition paths of the transfiguration candidate set extracted in Step S105, and selects the characteristic state transition path along which the transition that crosses the state groups occurs only once from among the identified characteristic state transition paths. Specifically, the behavior transfiguration search section 353 performs the following process on each of the characteristic state transition paths Q extracted in Step S105. First, the behavior transfiguration search section 353 obtains a state group sequence (g1, g2, . . . , gn) corresponding to each of the vertex sequences Q (v1, v2, . . . , vn). In addition, the behavior transfiguration search section 353 determines whether the state group sequence changes only once halfway as in (a, . . . , a, b, . . . , b), and selects the vertex sequence or characteristic state transition path Q in a case of determining that the state group sequence changes only once halfway; otherwise the behavior transfiguration search section 353 does not select the path Q. For example, according to FIG. 7, the state group sequence corresponding to the characteristic state group sequence A->B->D->E extracted in Step S105 is (1, 1, 2, 2), the state group sequence has the transition from the state group 1 to the state group 2 once but has no other transition crossing the state groups (for example, the transition from the state group 2 back to the state group 1). Thus, the behavior transfiguration search section 353 selects the state group sequence (1, 1, 2, 2) in the process described above. Furthermore, in a case of selecting two or more characteristic state transition paths in the above process, the behavior transfiguration search section 353 selects only one path that appears most effective. For example, the behavior transfiguration search section 353 selects only the path for which the number of elements in the list of customers who transitioned along the path calculated in Step S105 is the maximum.

Step S106 is described on the premise that the number of transition paths along which the transition that crosses the state groups occurs is one. In a case in which a plurality of transition paths along which the transition that crosses the state groups occurs are present, the candidate model creation section 352 selects the latest state transition path as the characteristic state transition path along which the transition that crosses the state groups occurs from among those state transition paths by referring to the dates, the purchase dates, and the like.

In Step S107, the behavior transfiguration search section 353 updates the analysis result by adding the analysis result up to Step S106 to the previously obtained analysis result. In a case in which the behavior transfiguration search section 353 does not select any path in Step S106, the behavior transfiguration search section 353 outputs the flag representing that the change in the behavior pattern was not discovered as in the transfiguration result ID "2" in FIG. 5. On the other hand, in a case of selecting the path in Step S106, the behavior transfiguration search section 353 outputs the flag representing that the change in the behavior pattern was discovered as in the transfiguration result ID "1" in FIG. 5. In the latter case, the behavior transfiguration search section 353 further adds a result in a format depicted in a lower side of FIG. 5 to the analysis result, and records the path selected in Step S106 as a value corresponding to a key "transition path." Furthermore, the behavior transfiguration search section 353 records the vertex ID in the state just before the transition that crosses the state groups as a value corresponding to a key "state just before change in behavior pattern," and records the vertex ID in the state just after the transition that crosses the state groups as a value corresponding to a key "state just after change in behavior pattern."

Moreover, the behavior transfiguration search section 353 records the vertex ID in the final state of the transition path discovered in Step S105 as a value corresponding to a key "state contributing to improving KPI," which is a result of the change in the behavior pattern. The behavior transfiguration search section 353 records a list of customer IDs indicating the customers moving along the path selected in Step S106 among the transfiguration candidates as a value corresponding to a key "list of customers having experienced change in behavior pattern."

In this way, according to the present embodiment, the candidate model creation section 352 classifies transfiguration candidates that are customers satisfying the transfiguration result information 230 that indicates a characteristic purchase behavior predicted to occur by the change in the behavior pattern of each of the customers, on the basis of the transfiguration result information 230 and the state transition model which is created on the basis of the purchase history information 210 about each customer and the customer attribute information 220 and which indicates the trend of the states of the customers; and the behavior transfiguration search section 353 selects the state transition path of the customer along which the transition crossing the state groups obtained by grouping the customer states by a predetermined method occurs from among the state transition paths of the customers having the characteristic state transition out of the customers classified as the transfiguration candidates, and outputs the analysis result containing the selected state transition path of the customer. Therefore, it is possible to discover the change in the behavior pattern contributing to improving the KPI among the changes in the behavior pattern occurring commonly to the customers having specific characteristics.

Moreover, the behavior transfiguration search section 353 identifies the latest state transition path among a plurality of state transition paths crossing the state groups for the customer having the plurality of state transition paths, and outputs the analysis result containing the identified state transition path as the characteristic state transition path of the customer. Therefore, even in a case of discovering a plurality of state transition paths crossing the state groups, analysis based on the latest state transition path of the customer can be performed.

Second Embodiment

In a second embodiment, an approach for discovering the change in the behavior pattern on the basis of the purchase history information and the customer attribute information will be described. The second embodiment differs from the first embodiment in that the transfiguration result information is automatically created on the basis of the purchase history information in the second embodiment while the transfiguration result information is created by the analyst in the first embodiment.

Figure 10:
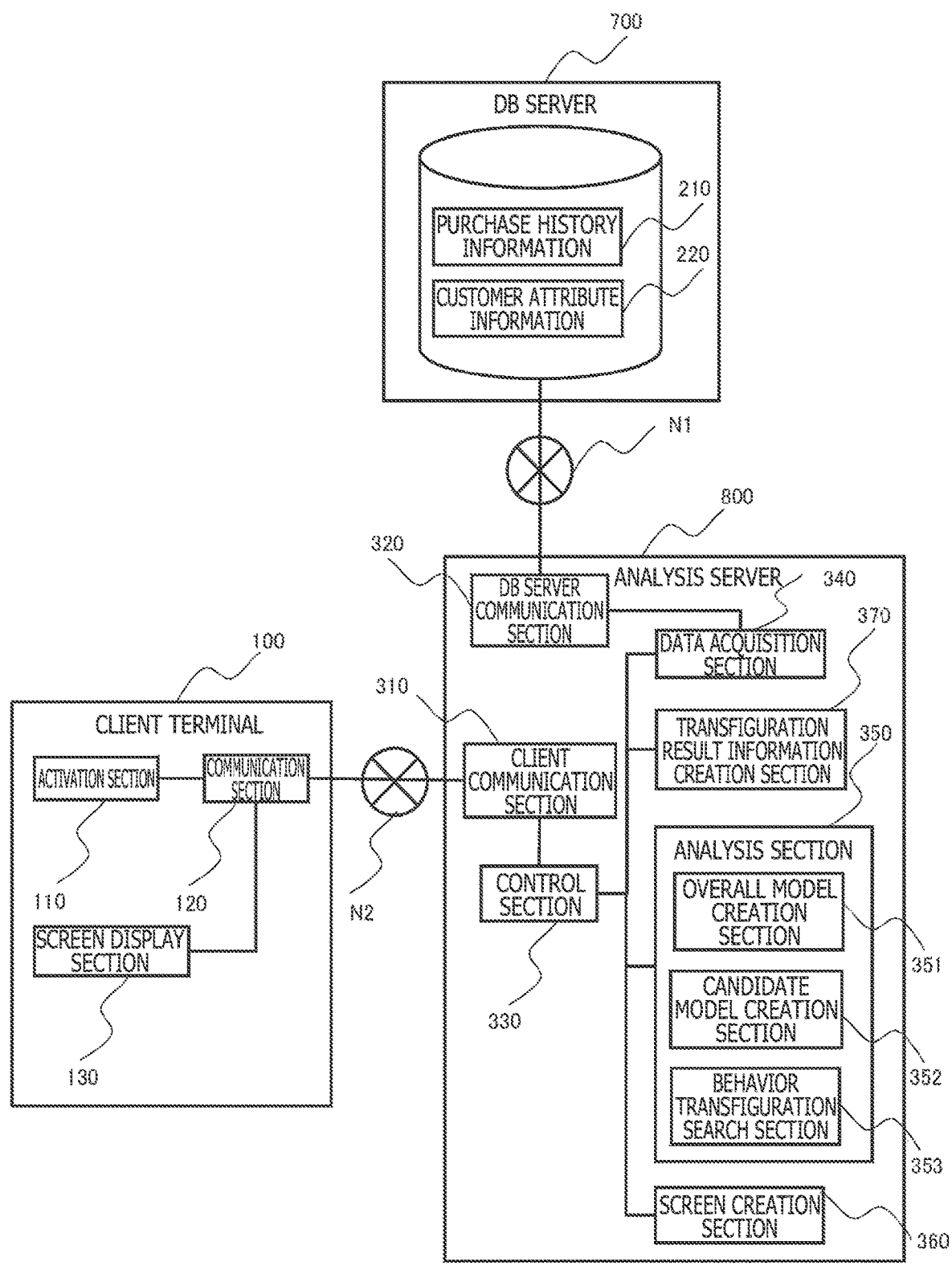
FIG. 10 is a system configuration diagram according to a second embodiment.

FIG. 10 is a system configuration diagram according to the present embodiment. In FIG. 10, a DB server 700 differs from the DB server 200 in the first embodiment in that the transfiguration result information 230 is not stored in the DB server 700. In addition, an analysis server 800 differs from the analysis server 300 in the first embodiment in that a transfiguration result information creation section 370 is held in the analysis server 800. Differences from the first embodiment will be mainly described below. The same constituent elements as those in the first embodiment are denoted by the same reference characters, and description thereof will be omitted while some of the constituent elements are described in particular.

The transfiguration result information creation section 370 is a program to which the purchase history information 210 is input and which creates the transfiguration result information 230. A flow until the data acquisition section 340 is activated by the control section 330 is the same as that in the first embodiment. The data acquisition section 340 acquires the purchase history information 210 and the customer attribute information 220 from the DB server 700, and stores these pieces of data in a memory of the analysis server 800. In addition, the data acquisition section 340 transmits the end signal and the data storage location to the control section 330 at a time of ending execution.

The control section 330 activates the transfiguration result information creation section 370, which is the program, with reception of the end signal from the data acquisition section 340 as a trigger. The transfiguration result information creation section 370 creates the transfiguration result information 230 on the basis of the purchase history information 210 as in FIG. 2. An example of a method of creating the transfiguration result information 230 will be described later. The transfiguration result information creation section 370 stores the generated transfiguration result information 230 in a memory of the analysis server 800. The transfiguration result information creation section 370 transmits an end signal and a data storage location to the control section 330 at a time of ending execution. The control section 330 activates the analysis section 350, which is the program, with reception of the end signal from the transfiguration result information creation section 370 as a trigger. The subsequent processes are similar to those described in the first embodiment.

Figure 11:
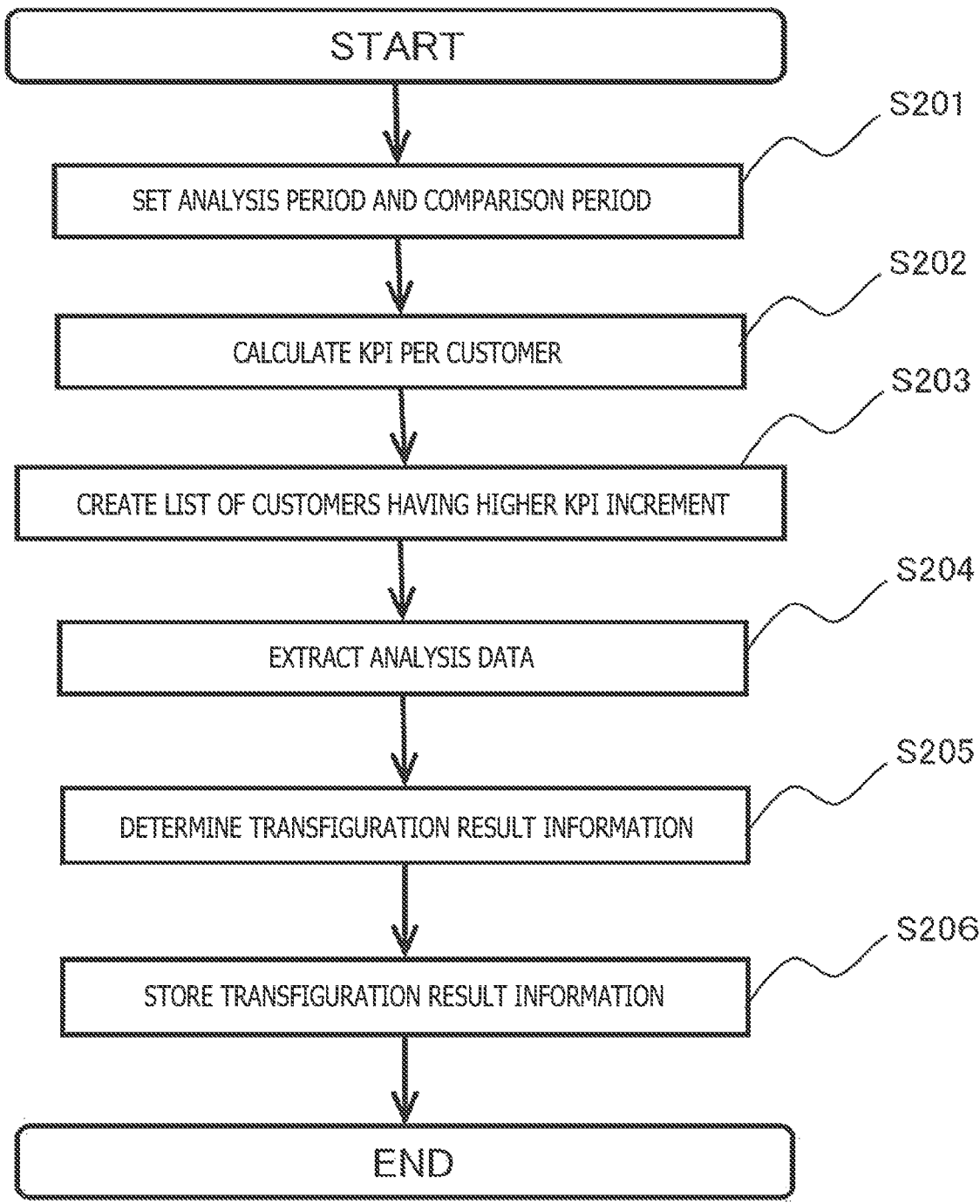
FIG. 11 is a flowchart of processes performed by a transfiguration result information creation section.

FIG. 11 is a flowchart illustrating processing procedures for a transfiguration result information creation process performed by the transfiguration result information creation section 370. Details of each step in FIG. 11 will be described hereinafter.

First, in Step S201, the transfiguration result information creation section 370 sets the analysis period and a comparison period for defining the transfiguration result information 230. The transfiguration result information creation section 370 sets, for example, the analysis period to most recent one month and the comparison period to one month before the analysis period. It is noted that an example may be conceivable such that the analysis period, the comparison period, and parameters a, b, c, d, and e used in the following steps are not fixed values but given as arguments by the analyst at a time of executing the activation section 110. In the subsequent steps, the transfiguration result information creation section 370 identifies characteristic purchase behaviors in the analysis period at a time of comparing the analysis period with the comparison period, and stores the identified characteristic purchase behaviors as the transfiguration result information.

In Step S202, the transfiguration result information creation section 370 calculates, per customer, KPIs in the analysis period and the comparison period, respectively. For example, the transfiguration result information creation section 370 calculates a sum of an amount sequence of the purchase history information 210 per customer.

In Step S203, the transfiguration result information creation section 370 extracts 'a' customers in an ascending order of a KPI increment of the analysis period, compared with the comparison period, as a list.

In Step S204, the transfiguration result information creation section 370 creates a list of pairs of commodity products purchased in the analysis period and the number of commodity products for each of the customers in the list extracted in Step S203, with pairs for the comparison period set as a reference. FIG. 12 illustrates an image of creation.

FIG. 12 is a diagram illustrating an example of a KPI increment list that is the list created by the transfiguration result information creation section 370 for calculating purchase-related KPI increments. As illustrated in FIG. 12, in the KPI increment list, a number (serial number) of each of the customers output in Step S203, a commodity products (commodity products) purchased in the analysis period and the number of the commodity products, the commodity product (commodity products) purchased in the comparison period and the number of the commodity products, and a difference between the number of the commodity products in the analysis period and the number thereof in the comparison period for each kind of purchased commodity product are stored to correspond to one another. In FIG. 12, it is indicated, for example, that a customer with a serial number "1" purchased two commodity products "A" in the comparison period, the customer purchased five commodity products "A" in the analysis period, and the difference of the analysis period from the comparison period is plus three. Likewise, it is indicated that the customer with the serial number "1" purchased four commodity product "B" in the comparison period, the customer purchased two commodity products "B" in the analysis period, and the difference of the analysis period from the comparison period is minus two. Likewise, it is indicated that a customer with a serial number "2" did not purchase the commodity product "A" in the comparison period but purchased four commodity products "A" in the analysis period, and the difference of the analysis period from the comparison period is plus four.

In Step S205, the transfiguration result information creation section 370 determines the transfiguration result information 230 on the basis of the list created in Step S204. For example, the transfiguration result information creation section 370 acquires e pairs (b, c, d) that satisfy a condition that a list of 'b' or more customers contains information to the effect that 'd' or more commodity products 'c' were purchased, and that have higher 'd'.

In Step S206, the transfiguration result information creation section 370 converts a result of Step S205 into the transfiguration result information 230 in a format as in FIG. 4, and stores the transfiguration result information 230 in the memory of the analysis server 800. For example, for each pair (b, c, d), in the transfiguration result information 230, the commodity product 'c' acquired in Step S205 is recorded as the commodity product set, the number 'd' acquired in Step S205 is recorded as the number (upper limit), and NULL is recorded as the number (lower limit). In addition, the analysis period calculated in Step S201 is recorded as the purchase period. Subsequently, processes similar to those in the first embodiment are executed in the second embodiment. In the second embodiment, similarly to the first embodiment, in a case in which a plurality of transition paths along which the transition that crosses the state groups occur are present, the candidate model creation section 352 selects the latest state transition path as the characteristic state transition path along which the transition that crosses the state groups occurs from among those state transition paths by referring to the dates, the purchase dates, and the like.

In this way, according to the present embodiment, the transfiguration result information creation section 370 creates the transfiguration result information 230 on the basis of increases and decreases of the numbers of purchased commodity products obtained by the behavior pattern of each customer in the predetermined periods (for example, the analysis period and the comparison period). This can save time and labor for the analyst to create the transfiguration result information 230.

Furthermore, the behavior transfiguration search section 353 identifies the latest state transition path among a plurality of state transition paths along which the transition crossing the state groups occurs for the customer having the plurality of transition paths among the transfiguration candidates classified using the transfiguration result information 230 created by the transfiguration result information creation section 370, and outputs the analysis result containing the identified state transition path as the characteristic state transition path of the customer. Therefore, even in a case of automatically creating the transfiguration result information 230, analysis based on the latest state transition path can be performed for the customer having the discovered plurality of state transition paths along which the transition crossing the state groups.

What is claimed is:

1. A behavior pattern search system comprising:
a first server including a database storing:
purchase history information indicating, for each of a plurality of customers, a customer identification, a purchase date of a product purchased, a product identification of the product purchased, and a quantity of the product purchased;
customer attribute information indicating, for each customer, the customer identification, and a number of coupons used by the customer; and
a plurality of predefined sets of purchase behaviors, each set is a combination of a plurality of product identifications (IDs), a lower limit of quantity purchased of the product IDs, an upper limit of quantity purchased of the product IDs, and a predetermined purchase period of the product IDs,
a second server, connected to the first server via a network, including a processor programmed to:
automatically generate a state transition model, the state transition model including a plurality of state groups, each state group including a plurality of vertexes each representing a state of a customer, the state indicating a combination of a number of products having product IDs purchased within a predetermined time period and a number of coupons used within the time period, each state of each vertex being a different combination,
automatically determine a plurality of vertex sequences respectively corresponding to each customer by determining, based on the purchase history information, the customer attribute information and the plurality of predefined sets of purchase behaviors, which vertex, among the plurality of vertexes of the plurality of state groups, each customer belongs to for each of at least two vertexes at respective at least two time periods in an analyst period,
automatically obtain first vertex sequences from among the plurality of vertex sequences that (1) have an end vertex with a customer having purchased products having product IDs in an amount greater than a predetermined amount within the predetermined time period of the end vertex and (2) that have a number of customers corresponding to a same vertex sequence which is greater than a first threshold,
automatically set the obtained first vertex sequences a state characteristic state transition paths,
automatically select, from among the characteristic state transition paths, a first characteristic state transition path that crosses from a first vertex in one state group to a second vertex in another state group in the respective vertex sequences of the characteristic state transition paths only once and automatically identify the customers who transitioned along the selected first characteristic state transition path as the customers who have a change in behavior pattern,
display a graphic indicating at least the state transition model including the state transition paths as a broken line, the selected first characteristic state transition path as a solid line, graphical representations of the vertexes of the two state groups and a list of customers who have the change in behavior pattern.

2. A behavior pattern search method comprising:
storing in a first server:
purchase history information indicating, for each of a plurality of customers, a customer identification, a purchase date of a product purchased, a product identification of the product purchased, and a quantity of the product purchased;
customer attribute information indicating, for each customer, the customer identification, and a number of coupons used by the customer; and
a plurality of predefined sets of purchase behaviors, each set is a combination of a plurality of product identifications (IDs), a lower limit of quantity purchased of the product IDs, an upper limit of quantity purchased of the product IDs, and a predetermined purchase period of the product IDs,
automatically generating, by the processor, a state transition model, the state transition model including a plurality of state groups, each state group including a plurality of vertexes each representing a state of a customer, the state indicating a combination of a number of products having product IDs purchased within a predetermined time period and a number of coupons used within the time period, each state of each vertex being a different combination,
automatically determine a plurality of vertex sequences respectively corresponding to each customer by determining, based on the purchase history information, the customer attribute information and the plurality of predefined sets of purchase behaviors, which vertex, among the plurality of vertexes of the plurality of state groups, each customer belongs to for each of at least two vertexes at respective at least two time periods in an analyst period, automatically obtain first vertex sequences from among the plurality of vertex sequences that (1) have an end vertex with a customer having purchased products having product IDs in an amount greater than a predetermined amount within the predetermined time period of the end vertex and (2) that have a number of customers corresponding to a same vertex sequence which is greater than a first threshold, automatically set the obtained first vertex sequences a state characteristic state transition paths, automatically selecting, by the processor, from among the characteristic state transition paths, a first characteristic state transition path that crosses from a first vertex in one state group to a second vertex in another state group only once in the respective vertex sequences of the characteristic state transition paths and automatically identify the customers who transitioned along the selected first characteristic state transition path as the customers who have a change in behavior pattern; and displaying, by the processor, a graphic indicating at least the state transition model including the state transition paths as a broken line, the selected first characteristic state transition path as a solid line, graphical representations of the vertexes of the two state groups and a list of customers who have the change in behavior pattern.

\* \* \* \* \*